United States Patent [19]

Johansen, Jr. et al.

[11] Patent Number: 5,558,708
[45] Date of Patent: Sep. 24, 1996

[54] SYSTEM AND METHOD FOR DISPERSING PIGMENT IN CEMENT BASED COMPOSITIONS

[75] Inventors: Charles J. Johansen, Jr., Katy; Ernest D. Hollas, Weimax; Robert L. Vecchio, Spring; Hani Zoumut, Houston, all of Tex.

[73] Assignee: C-Cure Corporation, Houston, Tex.

[21] Appl. No.: 438,781

[22] Filed: May 11, 1995

[51] Int. Cl.$^6$ .................................................. C04B 14/00
[52] U.S. Cl. .................. 106/712; 106/711; 106/694; 106/696; 106/709; 106/724; 106/790; 106/802; 106/803; 106/819; 106/823; 106/708
[58] Field of Search .................................. 106/711, 712, 106/724, 696, 694, 705, 709, 725, 726, 730, 737, 789, 790, 802, 803, 805, 819, 823, 708; 206/219, 321, 322, 524.1; 524/2, 650

[56] References Cited

U.S. PATENT DOCUMENTS

| | | | |
|---|---|---|---|
| 1,910,419 | 5/1933 | Amon | 106/712 |
| 3,667,976 | 6/1972 | Tanner | 106/97 |
| 3,670,785 | 6/1972 | Heiss et al. | 141/9 |
| 4,204,876 | 5/1980 | Bowden | 106/90 |
| 4,335,065 | 6/1982 | Ando | 264/87 |
| 4,443,567 | 4/1984 | Sternisa et al. | 523/211 |
| 4,495,228 | 1/1985 | Cornwell | 427/385.5 |
| 4,597,997 | 7/1986 | Weill | 427/288 |
| 4,717,016 | 1/1988 | Dalgleish | 206/0.5 |
| 4,792,236 | 12/1988 | Heinis et al. | 366/245 |
| 4,813,000 | 3/1989 | Wyman et al. | 364/526 |
| 4,859,504 | 8/1989 | Rossiter et al. | 427/262 |
| 4,946,505 | 8/1990 | Jungk | 106/712 |
| 5,120,367 | 6/1992 | Smith et al. | 106/712 |
| 5,199,986 | 4/1993 | Kröckert et al. | 106/712 |
| 5,224,595 | 7/1993 | Sugimoto et al. | 106/823 |
| 5,362,322 | 11/1994 | Johansen, Jr. et al. | 106/802 |

FOREIGN PATENT DOCUMENTS

| | | | |
|---|---|---|---|
| 3709909 | 11/1989 | Germany. | |
| 1078723 | 8/1967 | United Kingdom | C08G 45/00 |
| 2085463 | 4/1982 | United Kingdom | C09K 3/10 |
| 2183626 | 6/1987 | United Kingdom | B28C 7/00 |
| WO9212102 | 7/1992 | WIPO | C04B 24/14 |

OTHER PUBLICATIONS

Dow Latex 460 Product Brochure, Feb. 1987.
Technical Bulletin for Rovene® 4040, Oct. 1995.
Materials and Methods Standards Association Bulletin No. 14, Oct. 1, 1986.
C-Cure® Catalog, ©1988 (no month).
Rohm and Haas' Rhoplex® E-330 Product Brochure, ©1980 (no month).
Acrylic Modifiers for Cement "Resin Review" 1974 vol. XXIV, No. 2. (no month).
Acrylic Latex Modified Portland Cement, Joseph A. Lavelle, Presented at American Concrete Institute's 1986 Convention (no month).
Rohm and Haas' brochure entitled "Cement Modifiers and Bond Coats" (date unknown).
C-Cure Product Brochure for Colorcure 945, Grout Admixture (no date).
C-Cure Product Brochure for Supreme 925, Dry Set Grout (date unknown).
C-Cure Product Brochure for AR Grout 922, Commercial Sanded Grout (date unknown).
C-Cure Product Brochure for Supper White 927, Non-sanded "Wet Tile" Grout (date unknown).
C-Cure Product Brochure for MP Grout Nonsanded 923, Latex Modified Grout (date unknown).
C-Cure Product Brochure for PM Smooth Finish® Cementitious Finish (date unknown).
Air Products' Technical Data Sheet for Airbond® CP67 Dev Emulsion Cement Modifier (Date unknown).
Rohm and Haas' Rhoplex® MC-76 Product Brochure ©1986 (no month).

*Primary Examiner*—Mark L. Bell
*Assistant Examiner*—Michael Marcheschi
*Attorney, Agent, or Firm*—Hedman, Gibson & Costigan, P.C.

[57] ABSTRACT

A system and method for dispersing pigment in cement based compositions comprising a predetermined and prepackaged amount of a cement based component and a predetermined and prepackaged amount of an aqueous dispersion of a pigment containing component.

19 Claims, No Drawings

SYSTEM AND METHOD FOR DISPERSING PIGMENT IN CEMENT BASED COMPOSITIONS

FIELD OF THE INVENTION

This invention relates to a method and a system for uniformly dispersing pigment in cement based compositions such as mortars and grouts. More specifically, the invention relates to a multi component system comprising a predetermined quantity of a cement based component and a predetermined amount of an aqueous pigment component. The mixture of the two components results in a cement based composition of uniform and standardized color that is capable of being consistently reproduced if additional material is needed for a particular job.

BACKGROUND OF THE INVENTION

Cement based compositions have found broad use in industry as grouts and mortars. In particular, cement based compositions have been used for setting and grouting tile, for stuccos, for floor leveling and for patching mortars.

The addition of pigments or dyes to cement based compositions is well known in the art. For example, U.S. Pat. No. 4,204,876 teaches a pigment containing thixotropic slurry that can be stored in drums for 6–12 months by a cement contractor and used in a batching system. See also: U.S. Pat. Nos. 5,199,986, 3,667,976, 4,946,505, United Kingdom Patent No. 2,183,626, German Patent No. 3,709,909 and WO 92/12102 which are incorporated herein by reference and generally describe pigmented cement compositions. Traditionally, the addition of dyes or pigments to cement based compositions have been directed to large scale applications where highly sophisticated measuring devices have been available to insure correct color uniformity and shading.

Pigmented or colored cement based compositions such as grout, mortars and stuccos have been gaining popularity because they provide unique and distinctive appearances to various projects. In particular, colored cement compositions have gained popularity for small scale projects such as residential kitchens and baths.

Unfortunately, these small customized color cement composition projects are limited because the laborer does not have access to sophisticated measuring devices which can be used to consistently produce various quantities of cement based compositions with a uniform color. More importantly, retailers and distributors will not stock a wide variety of color mortars, grouts and stuccos because demand for a particular color or shade is not great enough to justify the large volume of shelve and storage space required to provide a full spectrum of colors and shades.

Therefore, it is an object of the present invention to provide multi-component system and method that can consistently produce a cement based composition with a uniform color without the need for sophisticated measuring equipment.

It is a further object of the present invention to provide a multi-component system that will allow a retailer or distributor to stock a full spectrum of colors and shades of cement based compositions, with minimum shelf space.

A further objective of the present invention is to provide a multi-component system and method that has little or no volatile organic components which can be emitted.

SUMMARY OF THE INVENTION

These and other objects of the present invention are achieved by a multi-component system comprising a predetermined amount of a cement based component and a predetermined amount of an aqueous based pigment component. The cement component and the pigment component are mixed together to produce a final composition that can be used in any application where cement based compositions have typically been used such as a for grouting and setting of tile, as a mortar or as a stucco.

The cement based component of the present invention comprises cement and optionally other conventional additives such as inert fillers. The conventional additives may be added as a separate component in the system but it is preferred that the fillers be premixed and prepackaged with the cement based component to insure, consistent color reproduction.

The cement of the cement based component is preferably a portland cement but other cements such as aluminious cement, portland blast furnace slag cement, portland pozzolan cement and mixtures of the foregoing may also be used.

The fillers that may be used comprise aggregate filler, fine filler or a combination of aggregate and fine fillers. The inert filler additive may be silica sand, limestone, perlite, volcanic aggregate, alumina trihydrate, ground quartz, volcanic ash, fine sand, talc, mica, clays, other clean inert material or mixtures of the foregoing. The inert filler aggregate component of the composition may comprise one, or a combination of clean inert materials. The ultimate criteria of the component being that such component be graded with not more than about 10 percent passing a number 140 sieve and none retained on a number 6 sieve, as well as having a AFS Grain Fineness Number (American Foundry Society) of not less than 100 but greater than 50.

The fine filler material should have an average particle size which is less than 140 mesh, and may include inert fillers such as limestone, alumina trihydrate, ground quartz, volcanic ash, certain fine sands, talc, mica, clays and the like.

Preferably, the cement based component comprises either white portland cement or gray portland cement. Preferably the cement based component is a grout powder commercially available from C-Cure Corp. of Houston, Tex. under the Trade name COLOR PERFECT GROUT BASE, a mortar commercially available from C-Cure Corp. of Houston, Tex. under the tradename AC-CENT or a cement finish commercially available from C-Cure Corp. of Houston, Tex. under the tradenames PM SMOOTH FINISH and EXTERIOR STUCCO.

The aqueous pigment component of the present invention comprises; water and a pigment or combination of pigments such as those described in U.S. Pat. No. 5,362,322 which are incorporated herein by reference. It is preferred that the aqueous pigment component have a viscosity of about 8000 cps (centipoise) to about 12000 cps and most preferably from about 9500 cps to about 10500 cps as determined by ASTM D2196-86.

It is preferred that the aqueous pigment component have a Hegman grind of about 4 to about 8 and most preferably from about 6 to about 7 as determined by ASTM D-1210-79.

Either the cement based component or the aqueous pigment component may further comprise conventional property enhancing additives such as latexes, polymers, liquefiers, reinforcing fibers, coalescence additives, preservatives, antifoaming agents, thixotropy, viscosity control agents, plasticizers, other miscellaneous additives commonly known in the art and any combination of the forgoing. These property enhancing additives are present in amounts commonly known in the industry. The enhancing additives may also be added to the present invention as a separate and distinct component or components which will allow the pigmented cement based composition of the present invention to be further customized for a particular application. For example, an acrylic copolymer dispersion of an acrylic ester and styrene may be premixed and prepackaged with the cement based component, aqueous pigment component or a separate component to impart elastomeric properties to the composition final composition.

Preferred latex additives are those commercially available from Dow Chemical under the Tradename DOW 460 or Ameripol Synpol Corp under the tradename 4040 SBR Latexes.

Preferred polymer additives are anionic and non anionic dispersions such as neoprene rubber, styrene, butadiene rubber or vinyl acrylic. Especially preferred polymer additives are acrylic based emulsions such as MC-76 which is commercially available from Rohm & Haas Co., Philadelphia, Pa., CP-67 commercially available from Air Products Co. of Allentown, Pa., and UNICAL 76 RES 1019 commercially available from Unical Corporation.

Preferred liquefiers include sodium naphthalene sulphates, sulphonated melamines, or melamine formaldehyde condensate. An especially preferred liquefier in MELMENT commercially available from SKW Chemicals, Inc.

Preferred reinforcing fibers are chopped fiberglass or polyethylene fibers. Especially preferred fibers are Wollanstonite reinforcing fibers commercially available from the James River Corporation.

Preferred coalescence additives are acetates such as butoxy-ethyl acetate, ethoxyethyl acetate, or butoxy ethoxyethyl acetate. Other preferred coalescence additives include toluene, xylene, hydrocarbon resins, mineral spirits and the like, and glycol esters such as n-butyl ethylene glycol ether and diethylene glycol ethyl ether.

Preferred thixotropy and viscosity additives are methyl cellulose, hydroxyethyl cellulose, carboxymethyl hydroxy ethyl cellulose, animal glues, various starches, alginates, polyvinyl alcohol and protein. Especially preferred thixotropy and viscosity improvers are METHQCEL K-100 methyl cellulose or METHOCEL 240 S hydroxypropyl methyl cellulose both are commercially available from Dow Chemical Co.

Preferred preservatives may be COSAN N 101 commercially available from CasChem, DOWACEL 75 commercially available from Dow Chemical Co., NUOSEPT 95 commercially available from Huls America Co. or TROYSAN 174 commercially available from Troy Chemical Co.

Preferred antifoaming agents are ANTIFOAM B commercially available from Dow Corning Silicon, GE 75 commercially available from General Electric Company, SAG 10 commercially available from Union Carbide or NOPCO NXZ or NDW both commercially available from Henkel Co.

Preferred plasticizers are chlorinated paraffin, asphalt emulsions, phthalates or phosphates.

Preferred non ionic surfactants are TRITON X-100, TERGITOL NP9, TRITON N-101 and TRITON CF-10 all commercially available from Union Carbide Co., and MAKON 10 commercially available from Stepan Chemical Co. The preferred anionic surfactants are TRITON X-200 commercially available from Union Carbide Co. and BIOSOFT D-60 commercially available from Stepan Chemical Co.

The other miscellaneous enhancing additives which may be used are ethylene glycol, calcium chloride, propylene glycol, vermiculite, chlorinated paraffins, bromine compounds, calcium formate, sodium stearate and calcium stearate. These miscellaneous additives are used to improve freeze thaw stability, accelerate setting, preventing shrinkage, efflorescense or sagging, flame retardancy or hydrophobic properties.

The multi-component system of the present invention is particularly useful on actual job sites to consistently and repeatedly produce small quantities of a cement based composition with uniform color. A cement based composition in accordance with the present invention is prepared on the job site by either mixing by hand or mechanical mixer a predetermined and preferably prepackaged amount of the cement based component with a predetermined and preferably prepackaged amount of the aqueous pigment component. Additional water may be added to bring the mixture to the proper consistency for application. If additional water is required, it is preferred that the empty container in which the aqueous pigment component was prepackaged, is used to precisely measure the volume of additional water.

Once one batch of the cement based composition is depleted a second or additional batches of the cement based composition can be prepared from the present invention as described above. The second or additional batches will have the same color and shade as the original batch.

DETAILED DESCRIPTION OF A PREFERRED EMBODIMENT

The present invention will be described in detail by reference to the following examples which are provided for illustrative purposes. The following examples should not be construed as limiting the invention. Many variations which do not depart from the spirit or scope of the present invention will suggest themselves to those skilled in the art. All such obvious modifications are within the intended scope of the invention.

PREPARATION 1

A cement based component is prepared by mixing 35 lbs of white portland cement, 63.95 lbs of fine silica sand exhibiting a 50–70 mesh, 1 lb of clay commercially available from the Kentucky-Tennessee Clay Co. under the tradename ALLAN A. F., and 0.05 lbs of poly vinyl alcohol commercially available from Air Products under the tradename 540. The components are mixed in a ribbon type blender for approximately 10 minutes.

PREPARATION 2

A cement based component is prepared by the procedure described for Preparation 1 except that 35 lbs of grey portland cement is used instead of the white portland cement.

PREPARATION 3

A cement based component is prepared by mixing 50 lbs of white portland cement, 49.65 lbs of limestone exhibiting approximately a 325 mesh value commercially available from Georgia Marble Co. under tradename No.9 WHITE, 0.05 lbs of poly vinyl alcohol commercially available from Air Products under the tradename 540, and 0.30 lbs of hydroxypropyl methyl cellulose, commercially available from Dow Chemical Co. under the tradename METHOCEL 240 S. The components are mixed in a ribbon type blender for approximately, 10 minutes.

PREPARATION 4

A cement based component is prepared by the proceed described for Preparation 3 except that 50 lbs of grey portland cement is used instead of the white portland cement.

PREPARATION 5

A one pint aqueous pigment component is prepared by adding 0.814 lbs of water and 0.204 lbs Dow 460 latex to a tank and mixing the water and latex in a Cowles type disperser at 200 rpms. While the water and latex are mixing, 0.003 lbs of Dow Corning Silicon, Antifoam B and 0.010 lbs of Union Carbide's non ionic surfactant Triton X-100 are added. After the antifoaming agent and surfactant are added, 0.086 lbs of calcium chloride which is approximately 77% flake and commercially available from Dow Chemicals under the tradename DOWFLAKE is added to the mixture.

Once the calcium chloride is dissolved in the mixture, the speed of the mixer is increased to 2000 rpms and 0.093 lbs of an attapulgite clay, commercially available from Engelhard Minerals Co. under the tradename ATTAGEL 40 is added to the mixture. After a smooth consistency to the mixture is obtained, 0.001 lbs of Troysan 174 is slowly added followed by 0.161 lbs of yellow oxide commercially available from Harcross Pigments, Inc. under the tradename YO2087, 0.003 lbs of red oxide commercially available from Harcross Pigments, Inc. under the tradename RO3097 and finally 0.024 lbs of black oxide commercially available from Harcross Pigments, Inc. under the tradename BK-5099.

The mixing continues at high speed until a lump free mixture is obtained with a Hegman grind of 6–7.

PREPARATION 6

A one pint aqueous pigment component is prepared by adding 0.758 lbs of water and 0.204 lbs Dow 460 latex to a tank and mixing the water and latex in a Cowles type disperser at 200 rpms. While the water and latex are mixing, 0.003 lbs of Dow Corning Silicon, Antifoam B and 0.010 lbs of Union Carbide's non ionic surfactant Triton X-100 are added. After the antifoaming agent and surfactant are added, 0.086 lbs of calcium chloride which is approximately 77% flake and commercially available from Dow Chemicals under the tradename DOWFLAKE is added to the mixture.

Once the calcium chloride is dissolved in the mixture, the speed of the mixer is increased to 2000 rpms and 0.093 lbs of an attapulgite clay, commercially available from Engelhard Minerals Co. under the tradename ATTAGEL 40 is added to the mixture. After a smooth consistency of the mixture is obtained, 0.001 lbs of Troysan 174 is slowly added followed by 0.32 lbs of yellow oxide commercially available from Harcross Pigments Inc. under the tradename YO2087, 0.104 lbs of red oxide commercially available from Harcross Pigments, Inc., under the tradename RO3097 and finally 0.108 lbs black oxide commercially available from Harcross Pigments, Inc., under the tradename BK-5099.

The mixing continues at high speed until a lump free mixture is obtained with a Hegman grind of 6–7

PREPARATION 7

A one pint aqueous pigment component is prepared by adding 0.903 lbs of water and 0.204 lbs of Dow 460 latex to a tank and mixing the water and latex in a Cowles type disperser at 200 rpms. While the water and latex are mixing, 0.003 lbs of Dow Corning Silicon, Antifoam B and 0.010 lbs of Union Carbide's non ionic surfactant Triton X-100 are added. After the antifoaming agent and surfactant are added, 0.086 lbs of calcium chloride which is approximately 77% flake and commercially available from Dow Chemicals under the tradename DOWFLAKE is added to the mixture.

Once the calcium chloride is dissolved in the mixture, the speed of the mixer is increased to 2000 rpms and 0.093 lbs of an attapulgite clay, commercially available from Engelhard Minerals Co. under the tradename ATTAGEL 40 is added to the mixture. After a smooth consistency for the mixture is obtained 0.001 lbs of Troysan 174 is slowly added followed by 0.099 lbs of black oxide commercially available from Harcross Pigments, Inc. under the tradename BK-5099.

The mixing continues at high speed until a lump free mixture is obtained with a Hegman grind of 6–7

EXAMPLE 1

A cement based composition in accordance with the present invention is prepared by pouring the aqueous pigment component of Preparation 5 into a mixing container. After the aqueous pigment component is added to the mixing container, one pint of water is added to the pint jar which held the aqueous pigment component. The pint of water is stirred in the jar and then poured into mixing container. The water addition and stirring step is repeated until a total of three pints of water and one pint of the aqueous pigment component are in the mixing container. The repeated rinsing of the aqueous pigment component jar with water assures that all of the pigment is removed from the jar and is present in the mixing container.

After the aqueous pigment and water are in the mixing container small amounts of the cement based component of Preparation 1 are added to the mixing container and mixed by hand or with a low rpm power mixer until 25 lbs of Preparation 1 have been added and a uniform mixture with no color streaks has been obtained. The resulting composition is a grout composition with uniform and consistently reproducible sandstone color.

EXAMPLE 2

A cement based composition in accordance with the present invention is prepared by mixing the aqueous pigment component of Preparation 6 with 25 lbs of the cement based component of Preparation 2 according to the procedure outlined in Example 1. The resulting composition is a grout with uniform and consistently reproducible russet color.

EXAMPLE 3

A cement based composition in accordance with the present invention is prepared by mixing the aqueous pigment component of Preparation 7 with 25 lbs of the cement based component of Preparation 2 according to the procedure outlined in Example 1. The resulting composition is a grout with uniform and consistently reproducible grey color.

EXAMPLE 4

A cement based composition in accordance with the present invention is prepared by pouring the aqueous pigment component of Preparation 5 into a mixing container.

After the aqueous pigment component is added to the mixing container, one pint of water is added to the pint jar which held the aqueous pigment component. The pint of water is stirred in the jar and then poured into mixing container. The water addition and stirring step is repeated until a total of five pints of water and one pint of the aqueous pigment component are in the mixing container. The repeated rinsing of the aqueous pigment component jar with water assures that all of the pigment is removed from the jar and is present in the mixing container.

After the aqueous pigment and water are in the mixing container small amounts of the cement based component of Preparation 3 are added to the mixing container and mixed by hand or with a low rpm power mixer until 25 lbs of Preparation 3 have been added and a uniform mixture with no color streaks has been obtained. The resulting composition is a non sanded grout composition with uniform and consistently reproducible light sandstone color.

EXAMPLE 5

A cement based composition in accordance with the present invention is prepared by mixing the aqueous pigment component of Preparation 6 with 25 lbs of the cement based component of Preparation 4 according to the procedure outlined in Example 4. The resulting composition is a non sanded grout with uniform and consistently reproducible light russet color.

In practice, it is preferred that the aqueous pigment component is packaged in pint size containers and the cement based component is packaged in 25 lb containers to eliminate the need for sophisticated measuring facilities on a job site. Other size packaging may also be used such as quart sized containers of the aqueous pigment and 50 lb containers of the cement based component or cup (8 fl. oz.) sized containers of the aqueous pigment and 12.5 lb containers of the cement based component.

It has also been found that the aqueous pigment component such as those described in Preparations 5–7 can be mixed with predetermined and prepackaged amounts of cement based products such as masonry mortars commercially available from C-Cure Corporation of Houston, Tex. under the tradename AC-CENT, cementitious finishes commercially available from C-Cure Corporation under the tradename PM SMOOTH FINISH and stuccos commercially available from C-Cure Corporation under the tradename EXTERIOR STUCCO.

All the above mentioned patents, publications and test methods are herein incorporated by reference.

We claim:

1. A system for producing a pigmented cement composition consisting essentially of:
   (a) a powder cement component; and
   (b) an aqueous pigment component wherein the cement component and pigment component are separately packaged and mixed together prior to use to produce a composition with a uniform and standardized color.

2. A system as defined in claim 1 wherein the cement component comprises cement and inert fillers.

3. A system as defined in claim 2 wherein the cement is selected from the group consisting of portland cement, portland blast-furnace slag cement, portland-pozzolan cement, aluminous cement and mixtures thereof.

4. A system as defined in claim 2 wherein the filler comprises silica sand, limestone, perlite, volcanic aggregate, alumina trihydrate, talc, mica, clays or mixtures thereof.

5. A system as defined in claim 2 wherein the cement component further comprises property enhancing additives which comprise polymers, liquefiers, reinforcing fibers, coalescence additives, preservatives, antifoaming agents, viscosity control agents or mixtures thereof.

6. A system as defined in claim 1 wherein the pigment component further comprises property enhancing additives which comprise polymers, liquefiers, reinforcing fibers, coalescence additives, preservatives, antifoaming agents, viscosity control agents or mixtures thereof.

7. A system as defined in claim 1 wherein the aqueous pigment component has a Hegman grind of about 4 to about 8.

8. A system as defined in claim 1 wherein the aqueous pigment component has a Hegman grind of about 6 to about 7.

9. A method for the preparation of a pigmented cement composition consisting essentially of:
   (a) pouring a prepackaged aqueous pigment component into a mixing container; and
   (b) mixing a prepackaged amount of a powder cement component with the aqueous pigment component in the mixing container to obtain a cement composition with a uniform and standardized color.

10. A method as defined in claim 9 wherein the aqueous pigment component has Hegman grind of about 4 to 8.

11. A method as defined in claim 10 wherein the aqueous pigment component has a Hegman grind of about 6 to about 7.

12. A method as defined in claim 9 wherein the aqueous pigment component comprises a pigment, water and property enhancing additives comprising polymers, liquefiers, reinforcing fibers, coalescence additives, preservatives, antifoaming agents, viscosity control agents or mixtures thereof.

13. A method as defined in claim 12 wherein the cement component comprises cement, inert fillers and property enhancing additives comprising polymers, liquefiers, reinforcing fibers, coalescence additives, preservatives, antifoaming agents, viscosity control agents or mixtures thereof.

14. A system as defined in claim 1 wherein the aqueous pigment component is supplied in more than one package.

15. A method as described in claim 9 wherein the aqueous pigment component is supplied in more than one package.

16. A system as defined in claim 1 wherein the pigmented cement composition is grout.

17. A method as defined in claim 9 wherein the pigmented cement composition is grout.

18. A system for producing a pigmented cement composition consisting of:
   (a) a powder cement component; and
   (b) an aqueous pigment component wherein the cement component and pigment component are separately packaged and mixed together prior to use to produce a composition with a uniform and standardized color.

19. A method for the preparation of a pigmented cement composition consisting of:
   (a) pouring a prepackaged aqueous pigment component into a mixing container; and
   (b) mixing a prepackaged amount of a powder cement component with the aqueous pigment component in the mixing container to obtain a cement composition with a uniform and standardized color.

* * * * *